United States Patent [19]
Kim et al.

[11] 3,910,913
[45] Oct. 7, 1975

[54] 4,5-DIAMINO-7H-PYRROLO[2,3-D]PYRIMIDINE DERIVATIVES

[75] Inventors: Dong H. Kim, Wayne; Arthur A. Santilli, Havertown, both of Pa.

[73] Assignee: American Home Products Corporation, New York, N.Y.

[22] Filed: July 5, 1973

[21] Appl. No.: 376,475

Related U.S. Application Data

[62] Division of Ser. No. 148,913, June 1, 1971, abandoned, which is a division of Ser. No. 874,053, Nov. 4, 1969, Pat. No. 3,631,045.

[52] U.S. Cl. .................. 260/256.4 N; 260/251 R; 260/256.4 R; 260/256.4 F; 260/256.5 R; 424/251
[51] Int. Cl.² .................................... C07D 239/42
[58] Field of Search ..................... 260/256.4 N

[56] References Cited
UNITED STATES PATENTS

| | | | |
|---|---|---|---|
| 3,120,507 | 2/1964 | Andrew et al. | 260/356.4 N X |
| 3,553,198 | 5/1971 | Santilli et al. | 260/251 R |

Primary Examiner—Richard L. Raymond
Attorney, Agent, or Firm—Joseph Martin Weigman

[57] ABSTRACT

The disclosure is directed to derivatives of 4,5-diamino-7H-pyrrolo[2,3-d]pyrimidines having the structural formula:

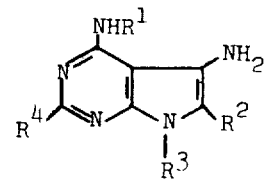

where $R^1 - R^4$ are as defined below, and to the 4,5,6-trisubstituted pyrimidines which are intermediates in their preparation. The compounds have central nervous system activity as depressants, that is, they produce a calming effect in the host.

4 Claims, No Drawings

4,5-DIAMINO-7H-PYRROLO[2,3-D]PYRIMIDINE DERIVATIVES

This application is a division of our application Ser. No. 148,913 filed June 1, 1971, and now abandoned which was in turn a division of our application Ser. No. 874,053 filed Nov. 4, 1969 which issued as U.S. Pat. No. 3,631,045 on Dec. 28, 1971.

This invention relates to derivatives of 4,5-diamino-7-methyl-7H-pyrrolo[2,3-d]pyrimidines and to intermediates for their preparation. More particularly, this invention relates to new and useful 4,5-diamino-7H-pyrrolo[2,3-d]pyrimidine-6-carbonitriles and 4,5-diamino-7H-pyrrolo[2,3-d]pyrimidine-6-carboxamides, and to intermediates in their preparation. The invention relates to the following intermediates: 4,6-dihalo-5-pyrimidinecarboxaldehydes; 4,6-dihalo-5-pyrimidinecarboxaldehyde, oximes, 4,6-dihalo-5-pyrimidinecarbonitriles; 6-amino- 4-halo-5-pyrimidinecarbonitriles and 6-amino-4-methylamino-5-pyrimidinecarbonitriles.

The compounds within the purview of the present invention are exemplified by the 4,5-diamino-7H-pyrrolo[2,3-d]pyrimidines having the following formula:

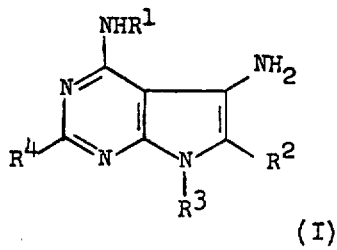

(I)

where $R^1$ is hydrogen or lower alkyl; $R^2$ is cyano, carboxamido or lower alkoxycarbonyl; $R^3$ is hydrogen or lower alkyl; and $R^4$ is lower alkyl, phenyl, halophenyl, lower alkylphenyl, lower alkoxyphenyl or lower alkylthio.

As used herein the terms "lower alkyl" and the like describe groups containing from 1 to about 4 carbon atoms.

Typical examples of the compounds of this invention which are depicted by structural formula (I) are: 4,5-diamino-7-methyl-2-phenyl-7H-pyrrolo[2,3-d]pyrimidine-6-carbonitrile and 5-amino-4-ethylamino-2-phenyl-7H-pyrrolo[2,3-d]pyrimidine6-carboxamide.

Also within the purview of the present invention are the 4,5,6-trisubstituted pyrimidines exemplified by the following formula which, as is explained below, are intermediates in the preparation of the compounds having formula (I):

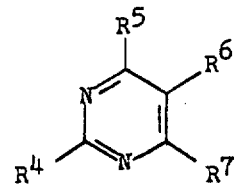

(II)

where $R^5$ is chloro, amino or lower alkylamino; $R^6$ is formyl, oximidomethylene and cyano; and $R^7$ is chloro or $N(R^u)CH_2R^r$ where $R^r$ is cyano or carboximido and $R^u$ is hydrogen or lower alkyl; with the proviso that when $R^6$ is formyl or oximidomethylene $R^5$ and $R^7$ are chloro.

Typical examples of the intermediate compounds of this invention which are depicted by structural formula (II) are: 4,6-dichloro-2-phenyl-5-pyrimidinecarboxaldehyde; 4,6-dichloro-2-phenyl-5-pyrimidonecarboxaldehyde, oxime; and 4,6-dichloro-2-phenyl-5-pyrimidinecarbonitrile.

The new and useful compounds of this invention may be prepared by the process which is hereinafter schematically illustrated.

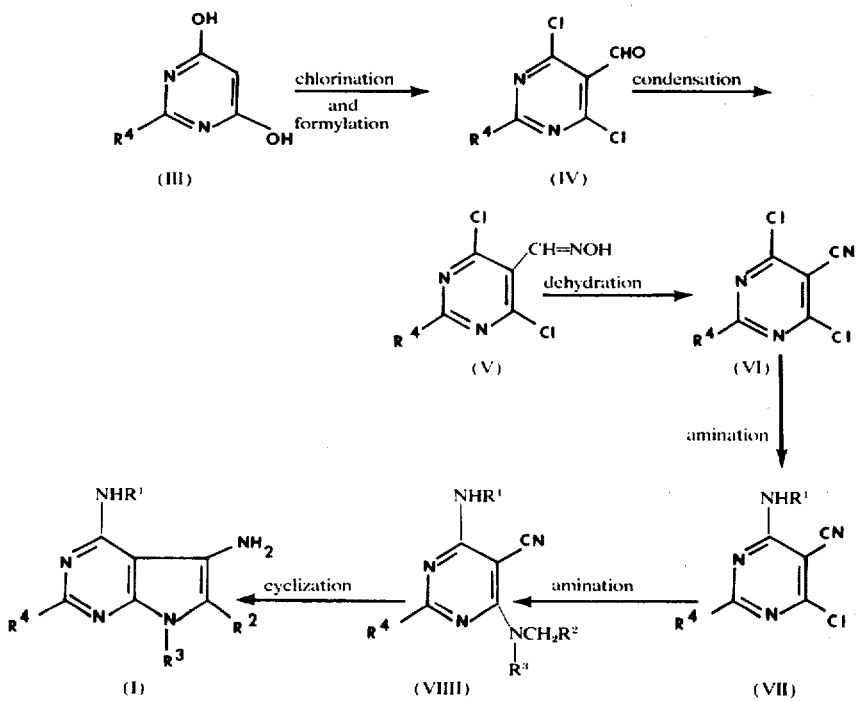

Where R¹-R⁷ are as described above.

The compounds are prepared by mixing phosphorus oxychloride and dimethylformamide in an ice bath and allowing the mixture to stand for about ¼ to 3 hours at a temperature of about 0° to 25°C., preferably at room temperature for about one hour. A 4,6-dihydroxypyrimidine is slowly added to the mixture and the resulting mixture allowed to stand for about ¼ to 1 hour. The reaction mixture then is heated for about 4 to 6 hours at a temperature of about 70° to 100°C., preferably about 5 hours at steam bath temperature to afford a 4,6 -dihalo-5-pyrimidine carboxaldehyde (IV). The first intermediate product (IV) is heated gently with a hydroxylamine affording the corresponding oxime: 4,6-dihalo-5-pyrimidinecarboxaldehyde oxime (V). The second intermediate product (V) is dehydrated to a 4,6-dichloro-5-pyrimidinecarbonitrile (VI) by heating with a dehydrating agent, such as thionyl chloride, for about 2 to 6 hours, preferably about 4 hours at reflux temperature. The third intermediate product is subjected to step-wise amination of the two halo groups. First the 4-halo group is replaced by stirring with an alcohol solution of ammonia at room temperature for about ½ to 1½ hours, preferably 1 hour, affording a 6-amino-4-halo-5-pyrimidinecarbonitrile (VII).

The 6-halo group may be replaced by a substituted methylamine by mixing the third intermediate product (VII) with substituted methylamine and heating at a temperature of about 70° to 90°C. for about 1 to 3 hours, preferably at the reflux temperature for about 2½ hours, thus affording a 6-amino-4-substituted methylamino-5-pyrimidinecarbonitrile (VIII). The fourth intermediate product (VIII) is cyclized by a Dieckmann type condensation to afford the product 4,5-diamino-6-substituted-7H-pyrrolo[2,3-d]pyrimidine (I).

Where the starting material contains an acetamido substituted methylamine in the 6-position, the end product is a 4,5-diamino-7H-pyrrolo[2,3-d]pyrimidine-6-carboxamide. Where the starting material contains a cyanomethylamino group in the 6-position, the end product is a 4,5-diamino-7H-pyrrolo[2,3-d]pyrimidine-6-carbonitrile.

When the reaction is completed the product (I) may be separated by standard recovery methods. For instance, the reaction mixture may be chilled in ice and the resulting precipitate collected on a filter and then recrystallized from absolute alkanol.

By a similar process 2-lower alkylthio derivatives of the compounds of formula I may be prepared by the following reaction scheme, where R² and R³ are as described above, and R⁹ is lower alkyl.

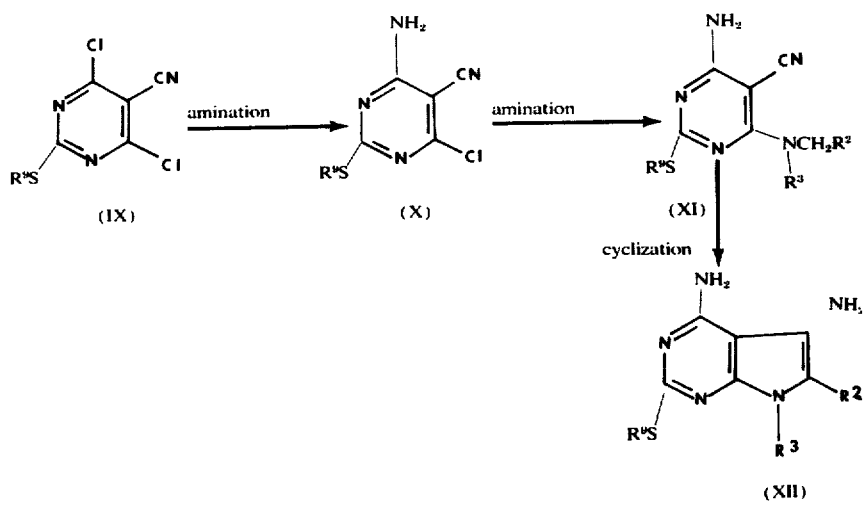

The 6-amino-4-halo-2-(lower)alkylthio-5-pyrimidine-carbonitrile starting materials may be prepared as described in a patent application entitled "5-Amino-2,4-disubstituted thieno[2,3-d]pyrimidine-6-carboxylic Acid Derivatives" filed on Nov. 4, 1969 as Ser. No. 874,056, and now abandoned.

The compounds may be prepared by mixing a 6-amino-4-halo-2-(lower)alkylthio-5-pyrimidinecarbonitrile with a substituted methylamine solution and heating at a temperature of about 60° to 80°C. for about ¼ to 3 hours, preferably at the reflux temperature for about one hour, thus affording a 6-amino-4-methylamino-2-(lower)alkylthio-5-pyrimidinecarbonitrile (XI). The latter intermediate product is cyclized by a Dieckmann type condensation to the 4,5-diamino-2-(lower) alkylthio-7H-pyrrolo[2,3-d]pyrimidines (XII).

Where the starting material contains an acetamido substituted methylamino in the 6-position, the end product is a 4,5-diamino-2-(lower)alkylthio-7H-pyrrolo[2,3-d]pyrimidine-6-carboxamide. Where the starting material contains a cyanomethylamino group in the 6-position, the end product is a 4,5-diamino-2-(lower)alkylthio-7H-pyrrolo[2,3-d]pyrimidine-6-carbonitrile.

When the reaction is complete the product (XII) may be separated by standard recovery methods.

The 5-amino-4,6-disubstituted-7H-pyrrolo[2,3-d]pyrimidines and 4,5-diamino-2-(lower)alkylthio-6-substituted-7H-pyrrolo[2,3-d]pyrimidines of the present invention have utility in experimental and comparative pharmacology as central nervous system depressants. They produce a calming effect in the host at a dosage of 12.7 to 400 milligrams per kilogram of host body weight (MPK). All of the compounds are non-lethal in the dose range up to the maximum tested dose, 400 MPK, except 4,5-diamino-7-methyl-2-methylthio-7H-pyrrolo[2,3-d]pyrimidine-6-carbonitrile which is an effective depressant at a dose of 12.7 MPK and was found to be non-lethal in doses as large as 127 MPK; and 4,6-dichloro-2-phenyl-5-pyrimidine-carboxaldehyde, oxime which was lethal at a dose of 12.7 MPK. The latter compound however, is a useful intermediate in the production of other compounds as described above, which are active as central nervous system depressants.

In the pharmacological evaluation of the biological activity of the compounds of this invention, the in vivo effects are tested as follows. The compound is administered orally or intraperitoneally to three mice (14 to 24 grams) at each of the following doses: 400, 127, 40 and 12.7 MPK. The animals are watched for a minimum of two hours during which time signals of general stimulation, (i.e., increased spontaneous motor activity, hyperactivity on tactile stimulation, twitching), general depression (i.e., decreased spontaneous motor activity, decreased respiration), autonomic activity (i.e., miosis, mydriasis, diarrhea) are noted.

When the compounds of this invention are employed as described above, they may be administered alone or in combination with pharmacologically acceptable carriers, the proportion of which is determined by the solubility and chemical nature of the compound, chosen route of administration and standard pharmacological practice. For example, they may be administered orally in the form of tablets or capsules containing such excipients as starch, milk, sugar, certain types of clay and so forth. They may be administered sublingually in the form of troches or lozenges in which the active ingredient is mixed with sugar and corn syrup; and then dehydrated sufficiently to make it suitable for pressing into a solid form. They may be administered orally in the form of solutions which may contain coloring and flavoring agents or they may be injected parenterally, that is intra-muscularly, intravenously or subcutaneously. For parenteral administration they may be used in the form of a sterile solution containing other solutes, for example, enough saline or glucose to make the solution isotonic.

The dosage of the present therapeutic agents will vary with the form of administration and the particular compound chosen. Furthermore, it will vary with the particular subject under treatment. Generally, treatment is initiated with small dosages substantially less than the optimum dose of the compound. Thereafter, the dosage is increased by small increments until the optimum effect under the circumstances is reached. It will generally be found that when the composition is administered orally, larger quantities of the active agent will be required to produce the same effect as a smaller quantity given parenterally. In general, the compounds of this invention are most desirably administered at a concentration level that will generally afford effective results without causing any harmful or deleterious side effects.

In order more clearly to disclose the nature of the present invention, specific examples of the practice of the invention are hereinafter given. It should be understood, however, that this is done solely by way of example and is intended neither to delineate the scope of the invention nor limit the ambit of the appended claims.

In the examples all the temperatures are given in degrees Centigrade and the following abbreviations are used: "ml." milliliters, "hr." for hours, "g." for grams, "min." for minutes, and "$\phi$" for the phenyl group $C_6H_5-$.

EXAMPLE I

The following illustrates the preparation of 4,6-dichloro-2-phenyl-5-pyrimidinecarboxaldehyde which is a compound of structure IV.

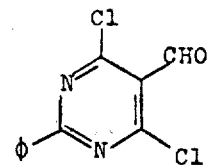

To 180 ml. of phosphorus oxychloride in an ice bath was added portionwise 35 ml. of dimethylformamide. After allowing the resulting solution to stand at room temperature for 1 hr., 25 g. of 4,6-dihydroxy-2-phenylpyrimidine was added slowly. The resulting solution was allowed to stand for 30 min. and then was heated for 5 hr. on a steam bath. The phosphorus oxychloride was removed under reduced pressure, and the residue was slowly poured over ice. The solid that separated was collected on a filter and washed with water. The crude product was recrystallized from ethanol and then from heptane giving a product having a melting point of 154°–156.5°.

The molecular formula $C_{11}H_6Cl_2N_2O$ was assumed for the product, and based on that formula it was calculated that the elemental analysis by weight would be 52.50 percent carbon, 2.39 percent hydrogen, 11.07 percent nitrogen and 28.02 percent chlorine. The assumed formula was determined to be accurate when it was found by analysis that the product actually contained 52.28 percent carbon, 2.41 percent hydrogen, 10.99 percent nitrogen and 27.77 percent chlorine. This may be expressed:

Anal. Calcd. for $C_{11}H_6Cl_2N_2O$:
C, 52.50 ; H, 2.39; N, 11.07; Cl, 28.02.
Found: C, 52.28; H, 2.41; N, 10.99; Cl, 27.77.

The product was evaluated in the foregoing pharmacological procedure and was found to decrease motor activity and respiration at a dose of 40 MPK administered parenterally.

Following the procedure of Example I but substituting appropriate starting materials, compounds having the following substituents may be obtained:

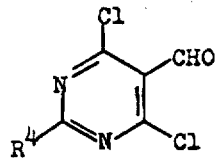

| Example | $R^1$ |
|---|---|
| I | 0 |
| I - 1 | p—ClO— |
| I - 2 | p—BrO— |
| I - 3 | p—IO— |
| I - 4 | p—FO— |
| I - 5 | o—ClO— |
| I - 6 | m—ClO— |
| I - 7 | p—BrO— |
| I - 8 | 4—CH$_3$O— |
| I - 9 | 3—C$_2$H$_5$O— |
| I - 10 | 3—C$_3$H$_7$O— |
| I - 11 | 3—C$_4$H$_9$O— |
| I - 12 | 3—CH$_3$OO— |
| I - 13 | 4—C$_2$H$_5$OO— |
| I - 14 | 4—C$_3$H$_7$OO— |
| I - 15 | 4—C$_4$H$_9$OO— |
| I - 16 | 3—CH$_3$O— |
| I - 17 | 4—C$_2$H$_5$O— |
| I - 18 | 4—C$_3$H$_7$O— |
| I - 19 | 4—C$_4$H$_9$O— |

EXAMPLE II

The following illustrates the preparation of 4,6-dichloro-2-phenyl-5-pyrimidinecarboxaldehyde, oxime which is a compound of structure V.

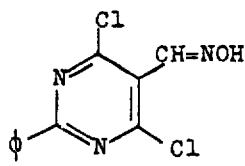

To a hot solution of 3.2 g. of hydroxylamine hydrochloride in 55 ml. aqueous acetic acid (50 ml. of glacial acetic acid, 5 ml. of water) was added 10.0 g. of 4,6-dichloro-2-phenyl-5-pyrimidinecarboxaldehyde. The reaction solution was heated gently for several minutes. Water was added until precipitation began. Chilling in ice afforded a solid, which was collected on a filter and washed several times with water. Recrystallization from ethanol afforded 2.2 g. of product having a melting point of 175°–177°.

Anal. Calcd. for $C_{11}H_7Cl_2N_3O$:
C, 49.28; H, 2.63; Cl, 26.45; N, 15.67.
Found: C, 49.09; H, 2.67; Cl, 26.16; N, 15.62.

The product was evaluated in the foregoing pharmacological procedure and was found to decrease motor activity and respiration at a dose of 40 MPK administered parenterally.

Following the procedure of Example II but substituting appropriate starting materials, compounds having the following substituents may be obtained:

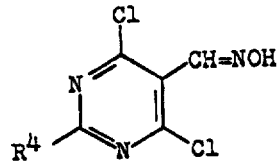

| Example | $R^4$ |
|---|---|
| II | 0 |
| II - 1 | p—ClO— |
| II - 2 | p—BrO— |
| II - 3 | p—IO— |
| II - 4 | p—FO— |
| II - 5 | o—ClO— |
| II - 6 | m—ClO— |
| II - 7 | p—BrO— |
| II - 8 | 4—CH$_3$O— |
| II - 9 | 3—C$_2$H$_5$O— |
| II - 10 | 3—C$_3$H$_7$O— |
| II - 11 | 3—C$_4$H$_9$O— |
| II - 12 | 3—CH$_3$OO— |
| II - 13 | 4—C$_2$H$_5$OO— |
| II - 14 | 4—C$_3$H$_7$OO— |
| II - 15 | 4—C$_4$H$_9$OO— |
| II - 16 | 3—CH$_3$O— |
| II - 17 | 4—C$_2$H$_5$O— |
| II - 18 | 4—C$_3$H$_7$O— |
| II - 19 | 4—C$_4$H$_9$O— |

EXAMPLE III

The following illustrates the preparation of 4,6-dichloro-2-phenyl-5-pyrimidinecarbonitrile which is a compound of structure V.

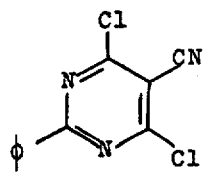

A solution of 3.7 g. of 4,6-dichloro-2-phenyl-5-pyrimidinecarboxaldehyde, oxime and 120 ml. of thionyl chloride was refluxed for 4 hr. The thionyl chloride was then removed under reduced pressure. The residue (2.9 g.) was recrystallized twice from ethyl acetate with charcoal treatment to give a pure compound having a melting point of 220.5°–224°.

Anal. Calcd. for $C_{11}H_5Cl_2N_3$:
C, 52.83; H, 2.02; Cl, 28.35; N, 16.80.
Found: C, 52.81; H, 2.21; Cl, 28.03; N, 16.81.

The product was evaluated in the foregoing pharmacological procedure and was found to decrease motor activity and decrease respiration at a dose of 127 MPK administered parenterally.

Following the procedure of Example III but substituting appropriate starting materials, compounds having the following substituents may be obtained.

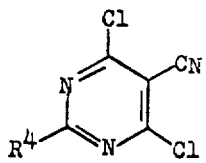

| Example | R¹ |
|---|---|
| III | () |
| III - 1 | p—ClO— |
| III - 2 | p—BrO— |
| III - 3 | p—IO— |
| III - 4 | p—FO— |
| III - 5 | o—ClO— |
| III - 6 | m—ClO— |
| III - 7 | p—BrO— |
| III - 8 | 4—CH₃O— |
| III - 9 | 3—C₂H₅O— |
| III - 10 | 3—C₃H₇O— |
| III - 11 | 3—C₄H₉O— |
| III - 12 | 3—CH₃OO— |
| III - 13 | 4—C₂H₅OO— |
| III - 14 | 4—C₃H₇OO— |
| III - 15 | 4—C₄H₉OO— |
| III - 16 | 3—CH₃O— |
| III - 17 | 4—C₂H₅O— |
| III - 18 | 4—C₃H₇O— |
| III - 19 | 4—C₄H₉O— |

EXAMPLE IV

The following illustrates the preparation of 4-amino6-chloro-2-phenyl-5-pyrimidinecarbonitrile which is a compound of structure VII.

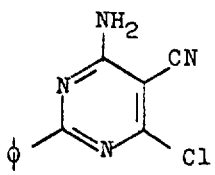

Two and eight-tenths grams of 4,6-dichloro-2-phenyl-5-pyrimidinecarbonitrile was added to 50 ml. of ethanol saturated with ammonia, and the resulting mixture was stirred at room temperature for 1 hr. The precipitate which resulted was collected on a filter, and washed with water to give 2.3 g. of product having a melting point of 237°–241°. Recrystallization from absolute ethanol improved the melting point to 238°–240°.

Anal. Calcd. for $C_{11}H_7N_4Cl$: C, 57.28; H, 3.06; N, 24.29; Cl, 15.37.

Found: C, 57.06; H, 3.07; N, 24.18; Cl, 15.04.

The product was evaluated in the foregoing pharmacological procedure and found to decrease motor activity and decrease respiration at a dose of 400 MPK administered parenterally.

Following the procedure of Example IV but substituting appropriate starting materials, compounds having the following substituents may be obtained:

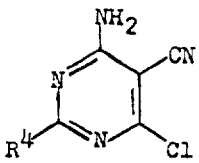

| Example | R¹ |
|---|---|
| IV | () |
| IV - 1 | p—ClO— |
| IV - 2 | p—BrO— |
| IV - 3 | p—IO— |
| IV - 4 | p—FO— |
| IV - 5 | o—ClO— |
| IV - 6 | m—ClO— |
| IV - 7 | p—BrO— |
| IV - 8 | 4—CH₃O— |
| IV - 9 | 3—C₂H₅O— |
| IV - 10 | 3—C₃H₇O— |
| IV - 11 | 3—C₄H₉O— |
| IV - 12 | 3—CH₃OO— |
| IV - 13 | 4—C₂H₅OO— |
| IV - 14 | 4—C₃H₇OO— |
| IV - 15 | 4—C₄H₉OO— |
| IV - 16 | 3—CH₃O— |
| IV - 17 | 4—C₂H₅O— |
| IV - 18 | 4—C₃H₇O— |
| IV - 19 | 4—C₄H₉O— |

EXAMPLE V

The following illustrates the preparation of 6-chloro-4-methylamino-2-phenyl-5-pyrimidinecarbonitrile which is a compound of structure VII.

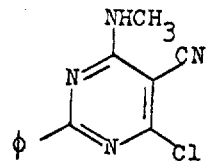

To a solution of 0.75 g. of methylamine in 50 ml. of cold ethanol, was added 2.5 g. of 4,6-dichloro-2-phenyl-5-pyrimidinecarbonitrile. After stirring the mixture for 3 min. at 0°, the solid was collected on a filter and recrystallized from benzene giving 1.2 g. of product having a melting point of 225°–228°.

Anal. Calcd. for $C_{12}H_9ClN_4$:
C, 58.90; H, 3.71, Cl, 14.49; N, 22.90.
Found: C, 58.96; H, 3.83; Cl, 14.23; N, 22.89.

The product was evaluated in the foregoing pharmacological procedure and found to decrease motor activity at a dose of 12.7 MPK administered parenterally.

EXAMPLE VI

The following illustrates the preparation of 4-chloro-6-ethylamino-2-phenyl-5-pyrimidinecarbonitrile which is a compound of structure VII.

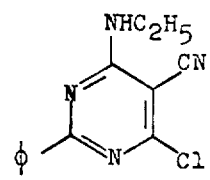

To a solution of 0.90 g. of ethylamine in 50 ml. of cold ethanol, was added 2.5 g. of 4,6-dichloro-2-phenyl-5-pyrimidinecarbonitrile. After stirring the mixture for 1 hr. at 0°, the solid (1.8 g.) which formed was collected on a filter. After two recrystallizations from heptane, the solid was dissolved in ether and the ether-insoluble material was filtered. The ether was taken to dryness giving an analytical sample having a melting point of 192°–194.5°.

Anal. Calcd. for $C_{13}H_{11}ClN_4$: C, 60.35; H, 4.29; Cl, 13.70; N, 21.66. Found: C, 60.09; H, 4.34; Cl, 13.88; N, 21.65.

The product was evaluated in the foregoing pharmacological procedure and was found to decrease motor activity at a dose of 12.7 MPK administered parenterally.

Following the procedure of Example VI but substituting appropriate starting materials, compounds having the following subtituents may be obtained:

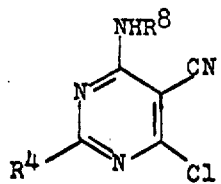

| Example | R¹ | Rⁿ |
|---|---|---|
| V | ϕ | $CH_3$ |
| VI | ϕ | $C_2H_5$ |
| VI - 1 | p—ClO— | $CH_3$ |
| VI - 2 | p—BrO— | $C_3H_7$ |
| VI - 3 | p—IO— | $C_4H_9$ |
| VI - 4 | p—FO— | $C_2H_5$ |
| VI - 5 | o—ClO— | $CH_3$ |
| VI - 6 | m—ClO— | $C_3H_7$ |
| VI - 7 | p—BrO— | $C_4H_9$ |
| VI - 8 | 4—$CH_3$O— | $C_2H_5$ |
| VI - 9 | 3—$C_2H_5$O— | $CH_3$ |
| VI - 10 | 3—$C_3H_7$O— | $C_3H_7$ |
| VI - 11 | 3—$C_4H_9$O— | $C_4H_9$ |
| VI - 12 | 3—$CH_3$OO— | $C_2H_5$ |
| VI - 13 | 4—$C_2H_5$OO— | $CH_3$ |
| VI - 14 | 4—$C_3H_7$OO— | $C_3H_7$ |
| VI - 15 | 4—$C_4H_9$OO— | $C_4H_9$ |
| VI - 16 | 3—$CH_3$O— | $C_2H_5$ |
| VI - 17 | 4—$C_2H_5$O— | $CH_3$ |
| VI - 18 | 4—$C_3H_7$O— | $C_3H_7$ |
| VI - 19 | 4—$C_4H_9$O— | $C_4H_9$ |

EXAMPLE VII

The following illustrates the preparation of 6-amino-4-[(cyanomethyl)methylamino]-2-phenyl-5-pyrimidinecarbonitrile which is a compound of structure VIII.

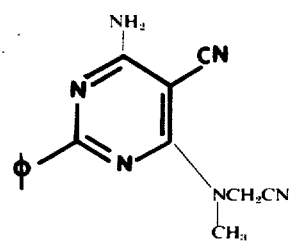

A mixture of methylaminoacetonitrile hydrochloride (10.6 g.), and sodium bicarbonate (10 g.) in 70 ml. of absolute ethanol was heated with stirring under reflux for ¾ hr. To the refluxing mixture was added 5.6 g. of 4-amino-6-chloro-2-phenyl-5-pyrimidinecarbonitrile. Refluxing was continued for an additional 2.5 hr. After cooling the reaction mixture to room temperature, the inorganic salt was removed by filtration, and the filtrate was concentrated under reduced pressure. Chilling of the concentrated solution caused separation of crystals which were collected on a filter and washed with water several times. Recrystallization of the crystals from absolute ethanol afforded 2.9 g. of product having a melting point of 202°–205°.

Anal. Calcd. for $C_{14}H_{12}N_6$: C, 63.62; H, 4.58; N, 31.80. Found: C, 63.47; H, 4.54; N, 31.61.

The product was analysed in the foregoing pharmacological procedure and was found to decrease motor activity at a dose of 127 MPK administered parenterally.

Following the procedure of Example VII but substituting appropriate starting materials, compounds having the following substituents may be obtained:

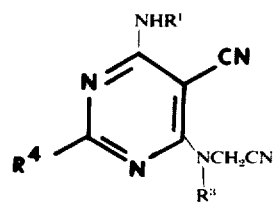

| Example | R⁴ | R¹ | R³ |
|---|---|---|---|
| VII | ϕ | H | $CH_3$ |
| VII - 1 | p—ClO— | $CH_3$ | $CH_3$ |
| VII - 2 | p—BrO— | $C_2H_5$ | $C_2H_5$ |
| VII - 3 | p—IO— | $C_3H_7$ | H |
| VII - 4 | p—FO— | $C_4H_9$ | $CH_3$ |
| VII - 5 | o—ClO— | H | $C_2H_5$ |
| VII - 6 | m—ClO— | $CH_3$ | $C_3H_7$ |
| VII - 7 | p—BrO— | $C_2H_5$ | $C_4H_9$ |
| VII - 8 | 4—$CH_3$O— | $C_3H_7$ | $C_2H_5$ |
| VII - 9 | 3—$C_2H_5$O— | $C_4H_9$ | H |
| VII - 10 | 3—$C_3H_7$O— | H | $CH_3$ |
| VII - 11 | 3—$C_4H_9$O— | $CH_3$ | H |
| VII - 12 | 3—$CH_3$OO— | $C_2H_5$ | $C_4H_9$ |
| VII - 13 | 4—$C_2H_5$OO— | $C_3H_7$ | $CH_3$ |
| VII - 14 | 4—$C_3H_7$OO— | $C_4H_9$ | $CH_3$ |
| VII - 15 | 4—$C_4H_9$OO— | H | H |
| VII - 16 | 3—$CH_3$O— | H | $CH_3$ |
| VII - 17 | 4—$C_2H_5$O— | $CH_3$ | $C_4H_9$ |
| VII - 18 | 4—$C_3H_7$O— | $C_2H_5$ | $C_2H_5$ |
| VII - 19 | 4—$C_4H_9$O— | $C_4H_9$ | $CH_3$ |

EXAMPLE VIII

The following illustrates the preparation of 2-[(5-cyano-6-methylamino-2-phenyl-4-pyrimidinyl)amino]acetamide which is a compound of structure VIII.

To a mixture of 15.4 g. of glycinamide hydrochloride, 11.2 g. of sodium bicarbonate and 80 ml. of 95 percent ethanol which had been refluxed for 45 min. was added 7.2 g. of 4-chloro-6-methylamino-2-phenyl-5-pyrimidinecarbonitrile and the resulting mixture was refluxed for 2½ hr. After being chilled in ice, the mixture was filtered, and the collected material was washed with water and then with hot benzene. Recrystallizations from dimethylformamide-water gave the product having a melting point of 267.5°–270°.

Anal. Calcd. for $C_{13}H_{14}N_6O$: C, 59.56; H, 5.00; N, 29.77. Found: C, 59.85; H, 4.95; N, 29.54.

The product was evaluated in the foregoing pharmacological procedure and found to decrease motor activity at a dose of 127 MPK administered parenterally.

EXAMPLE IX

The following illustrates the preparation of 2-(5-cyano-6-ethylamino-2-phenyl-4-pyrimidylamino)acetamide which is a compound of structure VIII.

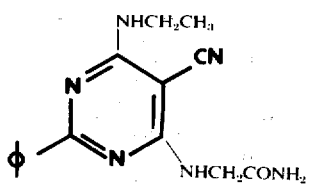

To a mixture of 10.0 g. of glycinamide hydrochloride, 7.55 g. of sodium bicarbonate and 200 ml. of 95 percent ethanol which had been refluxed for ¾ hr. was added 6.1 g. of 4-chloro-6-ethylamino-2-phenyl-5-pyrimidinecarbonitrile, and the resultant mixture was refluxed for 6 hr. After being chilled in ice, the compound was collected on a filter and washed several times with water and then with ether giving 5.3 g. Recrystallization from dimethylformamide-water gave a product having a melting point of 258°–261°.

Anal. Calcd. for $C_{15}H_{16}N_6O$: C, 60.79; H, 5.44; N, 28.36. Found: C, 61.12; H, 5.57; N, 28.38.

The product was evaluated in the foregoing pharmacological procedure and found to decrease motor activity at a dose of 400 MPK administered orally.

Following the procedure of Example IX but substituting appropriate starting materials, compounds having the following substituents may be obtained:

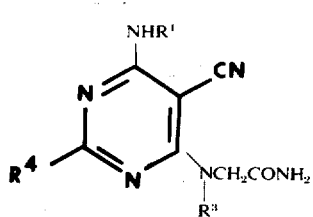

| Example | $R^1$ | $R^2$ | $R^3$ |
|---|---|---|---|
| VIII | Ø | $CH_3$ | H |
| IX | Ø | $C_2H_5$ | H |
| IX - 1 | p—ClØ— | $CH_3$ | $CH_3$ |
| IX - 2 | p—BrØ— | $C_2H_5$ | $C_2H_5$ |
| IX - 3 | p—IØ— | $C_3H_7$ | H |
| IX - 4 | p—FØ— | $C_4H_9$ | $CH_3$ |
| IX - 5 | o—ClØ— | H | $C_2H_5$ |
| IX - 6 | m—ClØ— | $CH_3$ | $C_3H_7$ |
| IX - 7 | p—BrØ— | $C_2H_5$ | $C_4H_9$ |
| IX - 8 | 4—$CH_3$O— | $C_3H_7$ | $C_2H_5$ |
| IX - 9 | 3—$C_2H_5$O— | $C_4H_9$ | H |
| IX - 10 | 3—$C_3H_7$O— | H | $CH_3$ |
| IX - 11 | 3—$C_4H_9$O— | $CH_3$ | H |
| IX - 12 | 3—$CH_3$OØ— | $C_2H_5$ | $C_4H_9$ |
| IX - 13 | 4—$C_2H_5$OØ— | $C_3H_7$ | $CH_3$ |
| IX - 14 | 4—$C_3H_7$OØ— | $C_4H_9$ | $CH_3$ |
| IX - 15 | 4—$C_4H_9$OØ— | H | H |
| IX - 16 | 3—$CH_3$O— | H | $CH_3$ |
| IX - 17 | 4—$C_2H_5$O— | $CH_3$ | $C_4H_9$ |
| IX - 18 | 4—$C_3H_7$O— | $C_2H_5$ | $C_2H_5$ |
| IX - 19 | 4—$C_4H_9$O— | $C_3H_7$ | $CH_3$ |

EXAMPLE X

The following illustrates the preparation of 4,5-diamino-7-methyl-2-phenyl-7H-pyrrolo[2,3-d]pyrimidine-6-carbonitrile which is a compound of structure I.

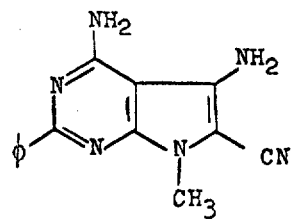

To a solution containing 0.18 g. of sodium in 25 ml. of absolute ethanol was added 2.0 g. of 6-amino-4-[(cyanomethyl)methylamino]-2-phenyl-5-pyrimidinecarbonitrile. The mixture was refluxed for 1.5 hr., chilled in ice and the resulting precipitate was collected on a filter to give 0.5 g. of product. The product was purified by recrystallizing from absolute ethanol and decomposed at 212°–214°.

Anal. Calcd. for $C_{14}H_{12}N_6$: C, 63.62; H, 4.58; N, 31.80. Found: C, 63.91; H, 4.54; N, 31.63.

The product was evaluated in the foregoing pharmacological procedure and found to decrease motor activity at a dose of 127 MPK administered parenterally.

Following the procedure of Example X but substituting appropriate starting materials, compounds having the following substituents may be obtained:

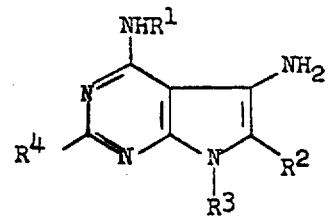

| Example | $R^1$ | $R^2$ | $R^3$ | $R^4$ |
|---|---|---|---|---|
| X | H | CN | $CH_3$ | Ø |
| X - 1 | H | CN | $C_2H_5$ | p—ClØ— |
| X - 2 | H | —$CO_2CH_3$ | $C_3H_7$ | p—BrØ— |
| X - 3 | H | CN | $C_4H_9$ | p—IØ— |
| X - 4 | $CH_3$ | —$CO_2C_2H_5$ | H | p—FØ— |
| X - 5 | $C_2H_5$ | CN | H | o—ClØ— |
| X - 6 | $C_3H_7$ | —$CO_2C_3H_7$ | H | m—ClØ— |
| X - 7 | $C_4H_9$ | CN | H | p—BrØ— |
| X - 8 | $CH_3$ | —$CO_2C_4H_9$ | $CH_3$ | 4—$CH_3$O— |
| X - 9 | $C_2H_5$ | CN | $C_2H_5$ | 3—$C_2H_5$O— |
| X - 10 | $C_3H_7$ | —$CO_2CH_3$ | $C_3H_7$ | 3—$C_3H_7$O— |

-Continued

| Example | R¹ | R² | R³ | R⁴ |
|---|---|---|---|---|
| X - 11 | C₄H₉ | —CN | C₄H₉ | 3— C₄H₉O— |
| X - 12 | CH₃ | —CO₂C₂H₅ | C₂H₅ | 3—CH₃OO— |
| X - 13 | C₂H₅ | —CN | C₃H₇ | 4—C₂H₅OO— |
| X - 14 | C₃H₇ | —CO₂C₃H₇ | C₂H₅ | 4—C₃H₇OO— |
| X - 15 | C₄H₉ | —CN | C₂H₅ | 4—C₄H₉OO— |
| X - 16 | C₂H₅ | —CO₂C₄H₉ | C₃H₇ | 3—CH₃O— |
| X - 17 | C₄H₉ | —CN | CH₃ | 4—C₂H₅O— |
| X - 18 | CH₃ | —CO₂CH₃ | CH₃ | 4—C₃H₇O— |
| X - 19 | H | —CN | H | 4—C₄H₉O— |

EXAMPLE XI

The following illustrates the preparation of 5-amino-4-methylamino-2-phenyl-7H-pyrrolo[2,3-d]pyrimidine-6-carboxamide which is a compound of structure I.

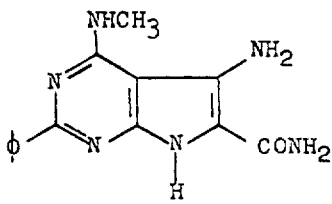

To a sodium ethoxide solution (0.24 g. sodium, 50 ml. ethanol) was added 3.0 g. of 2-[(5-cyano-6-methylamino-2-phenyl-4-pyrimidinyl)amino]acetamide, and the mixture was refluxed for 1 hr. After being chilled in ice, the solid (2.8 g.) was collected. It was triturated with hot ethyl acetate and filtered. The compound did not melt below 320°.

Anal. Calcd. for C₁₄H₁₄N₆O: C, 59.56; H, 5.00; N, 29.77. Found: C, 59.63; H, 4.80; N, 29.51.

The product was evaluated in the foregoing pharmacological procedure and found to decrease motor activity at a dose of 12.7 MPK administered parenterally.

EXAMPLE XII

The following illustrates the preparation of 5-amino-4-ethylamino-2-phenyl-7H-pyrrolo[2,3-d]pyrimidine-6-carboxamide which is a compound of structure I.

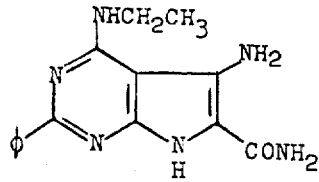

To a sodium ethoxide solution (0.26 g. sodium, 50 ml. ethanol) was added 3.3 g. of 2-(5-cyano-6-ethylamino-2-phenyl-4-pyrimidylamino)acetamide, and the resulting mixture was refluxed for 40 min. After being chilled in ice a solid separated and was collected on a filter, washed with water and then ether. The product (2.5 g.) was recrystallized from dimethylformamide and had a melting point higher than 360°.

Anal. Calcd. for C₁₅H₁₆N₆O: C, 60.79; H, 5.44; N, 28.36. Found: C, 60.79; H, 5.45; N, 28.09.

The product was evaluated in the foregoing pharmacological procedure and found to decrease motor activity at a dose of 400 MPK administered parenterally.

Following the procedure of Example XII but substituting appropriate starting materials, compounds having the following substitutents may be obtained:

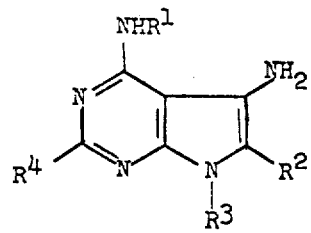

| Example | R¹ | R² | R³ | R⁴ |
|---|---|---|---|---|
| XI | CH₃ | CONH₂ | H | 0 |
| XII | C₂H₅ | CONH₂ | H | 0 |
| XII - 1 | H | —CO₂CH₃ | C₂H₅ | p—ClO— |
| XII - 2 | H | CONH₂ | C₃H₇ | p—BrO— |
| XII - 3 | H | —CO₂C₂H₅ | C₄H₉ | p—IO— |
| XII - 4 | CH₃ | CONH₂ | H | p—FO— |
| XII - 5 | C₂H₅ | —CO₂C₃H₇ | H | o—ClO— |
| XII - 6 | C₄H₇ | CONH₂ | H | m—ClO— |
| XII - 7 | C₄H₉ | —CO₂C₄H₉ | H | p—BrO— |
| XII - 8 | CH₃ | CONH₂ | CH₃ | 4—CH₃O— |
| XII - 9 | C₂H₅ | —CO₂CH₃ | C₂H₅ | 3—C₂H₅O— |
| XII - 10 | C₃H₇ | CONH₂ | C₃H₇ | 3—C₃H₇O— |
| XII - 11 | C₄H₉ | —CO₂C₂H₅ | C₄H₉ | 3—C₄H₉O— |
| XII - 12 | CH₃ | CONH₂ | C₂H₅ | 3—CH₃OO— |
| XII - 13 | C₂H₅ | —CO₂C₃H₇ | C₃H₇ | 4—C₂H₅OO— |
| XII - 14 | C₃H₇ | CONH₂ | C₂H₅ | 4—C₃H₇OO— |
| XII - 15 | C₄H₉ | —CO₂C₄H₉ | C₂H₅ | 4—C₄H₉OO— |
| XII - 16 | C₂H₅ | CONH₂ | C₃H₇ | 3—CH₃O— |
| XII - 17 | C₄H₉ | —CO₂CH₃ | CH₃ | 4—C₂H₅O— |
| XII - 18 | CH₃ | CONH₂ | CH₃ | 4—C₃H₇O— |
| XII - 19 | H | —CONH₂ | H | 4—C₄H₉O— |

EXAMPLE XIII

The following illustrates the preparation of 6-amino-4-[(cyanomethyl)methylamino]-2-methylthio-5-pyrimidinecarbonitrile which is a compound of structure XI.

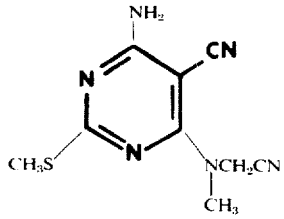

A mixture of methylaminoacetonitrile hydrochloride (10.6 g.) and sodium bicarbonate (10 g.) in 70 ml. of absolute ethanol was heated with stirring under reflux for 45 min. To the refluxing mixture was added 5.7 g. of 6-amino-4-chloro-2-methylthio-5-pyrimidinecarbonitrile. Refluxing was continued for an additional 2.5 hr. After cooling the reaction mixture to room temperature, the inorganic salt was removed by filtration, and the filtrate was concentrated under reduced pressure. Chilling of the concentrated solution caused separation of crystals which were collected on a filter and washed with water several times. Recrystallization of the crystals from absolute ethanol afforded 3.1 g. of product having a melting point of 205°–207°.

Anal. Calcd. for $C_9H_{10}N_6S$: C, 46.15; H, 4.30; N, 35.88; S, 13.66. Found: C, 46.32; H, 4.09; N, 35.63; S, 13.94.

Following the procedure of Exammple XIII but substituting appropriate starting materials, compounds having the following substituents may be obtained:

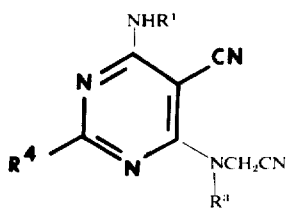

| Example | $R^1$ | $R^1$ | $R^3$ |
|---|---|---|---|
| XIII | $CH_3S—$ | H | $CH_3$ |
| XIII - 1 | $C_2H_5S—$ | $CH_3$ | $CH_3$ |
| XIII - 2 | $C_3H_5S—$ | $C_2H_5$ | $C_2H_5$ |
| XIII - 3 | $C_4H_9S—$ | $C_3H_7$ | H |
| XIII - 4 | $CH_3S—$ | $C_4H_9$ | $CH_3$ |
| XIII - 5 | $C_2H_5S—$ | H | $C_2H_5$ |
| XIII - 6 | $C_3H_5S—$ | $CH_3$ | $C_3H_7$ |
| XIII - 7 | $CH_3S—$ | $C_2H_5$ | $C_4H_9$ |
| XIII - 8 | $C_2H_5S—$ | $C_3H_7$ | $C_2H_5$ |
| XIII - 9 | $CH_3S—$ | $C_4H_9$ | H |
| XIII - 10 | $CH_3S—$ | H | $CH_3$ |
| XIII - 11 | $C_2H_5S—$ | $CH_3$ | H |
| XIII - 12 | $C_3H_5S—$ | $C_2H_5$ | $C_4H_9$ |
| XIII - 13 | $CH_3S—$ | $C_3H_7$ | $CH_3$ |
| XIII - 14 | $C_4H_9S—$ | $C_4H_9$ | $CH_3$ |
| XIII - 15 | $CH_3S—$ | H | H |
| XIII - 16 | $C_2H_5S—$ | H | $CH_3$ |
| XIII - 17 | $C_3H_5S—$ | $CH_3$ | $C_4H_9$ |
| XIII - 18 | $C_4H_9S—$ | $C_2H_5$ | $C_2H_5$ |
| XIII - 19 | $CH_3S—$ | $C_4H_9$ | $CH_3$ |

EXAMPLE XIV

The following illustrates the preparation of 2-[(6-amino-5-cyano-2-methylthio-4-pyrimidyl)amino]acetamide which is a compound of structure XI.

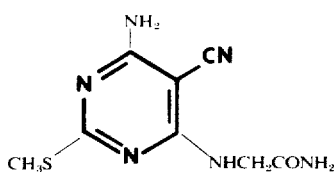

To a mixture of 11 g. of glycinamide hydrochloride, 8.4 g. of sodium bicarbonate, and 70 ml. of 95 percent ethanol which had been refluxed for 45 min. was added 5.9 g. of 4-amino-6-chloro-2-methylthio-5-pyrimidinecarbonitrile and the resulting mixture was refluxed for 2½ hr. After being chilled in ice, the mixture was filtered, and the collected material was washed with water and then with hot benzene. The crude product was recrystallized from dimethylformamide giving a product which decomposed at 279°–281°.

Anal. Calcd. for $C_8H_{10}N_6OS$: C, 40.33; H; 4.23; N, 35.28; S, 13.43. Found: C, 40.30; H, 4.09; N, 34.82; S, 13.10.

The product was evaluated in the foregoing pharmacological procedure and found to decrease motor activity and respiration at a dose of 400 MPK administered orally.

Following the procedure of Example XIV but substituting appropriate starting materials, compounds having the following substituents may be obtained:

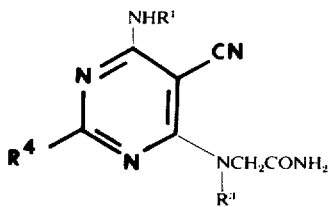

| Example | $R^1$ | $R^1$ | $R^3$ |
|---|---|---|---|
| XIV | $CH_3S—$ | H | H |
| XIV - 1 | $C_2H_5S—$ | $CH_3$ | $CH_3$ |
| XIV - 2 | $C_3H_5S—$ | $C_2H_5$ | $C_2H_5$ |
| XIV - 3 | $C_4H_9S—$ | $C_3H_7$ | H |
| XIV - 4 | $CH_3S—$ | $C_4H_9$ | $CH_3$ |
| XIV - 5 | $C_2H_5S—$ | H | $C_2H_5$ |
| XIV - 6 | $C_3H_5S—$ | $CH_3$ | $C_3H_7$ |
| XIV - 7 | $CH_3S—$ | $C_2H_5$ | $C_4H_9$ |
| XIV - 8 | $C_2H_5S—$ | $C_3H_7$ | $C_2H_5$ |
| XIV - 9 | $CH_3S—$ | $C_4H_9$ | H |
| XIV - 10 | $CH_3S—$ | H | $CH_3$ |
| XIV - 11 | $C_2H_5S—$ | $CH_3$ | H |
| XIV - 12 | $C_3H_5S—$ | $C_2H_5$ | $C_4H_9$ |
| XIV - 13 | $CH_3S—$ | $C_3H_7$ | $CH_3$ |
| XIV - 14 | $C_4H_9S—$ | $C_4H_9$ | $CH_3$ |
| XIV - 15 | $CH_3S—$ | H | H |
| XIV - 16 | $C_2H_5S—$ | H | $CH_3$ |
| XIV - 17 | $C_3H_5S—$ | $CH_3$ | $C_4H_9$ |
| XIV - 18 | $C_4H_9S—$ | $C_2H_5$ | $C_2H_5$ |
| XIV - 19 | $CH_3S—$ | $C_4H_9$ | $CH_3$ |

EXAMPLE XV

The following illustrates the preparation of 4,5-diamino-7-methyl-2-methylthio-7H-pyrrolo[2,3-d]pyrimidine-6-carbonitrile which is a compound of structure XII.

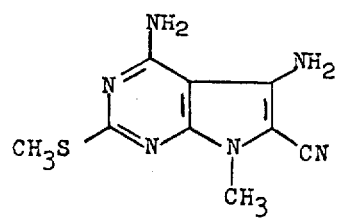

To a solution containing 0.2 g. of sodium in 30 ml. of absolute ethanol was added 2.3 g. of 6-amino-4-[(cyanomethyl)-methylamino]-2-methylthio-5-pyrimidinecarbonitrile. The resulting mixture was refluxed for 1.5 hr. After cooling the reaction mixture the resulting precipitate was collected on a filter. The product amounted to 1.8 g. and decomposed at 238°–240°. Recrystallization from absolute ethanol raised the decomposition point of 240°–242°.

Anal. Calcd. for $C_9H_{10}N_6S$: C, 46.15; H, 4.30; N, 35.88. Found: C, 46.02; H, 4.09; N, 35.73.

The product was evaluated in the foregoing pharmacological procedure and found to decrease motor activity and respiration at a dose of 12.7 MPK administered orally.

Following the procedure of Example XV but substituting appropriate starting materials, compounds having the following substituents may be obtained:

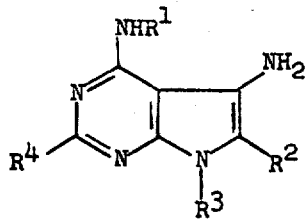

| Example | R¹ | R² | R³ | R⁴ |
|---|---|---|---|---|
| XV | H | CN | CH₃ | CH₃S— |
| XV - 1 | H | CN | C₂H₅ | C₂H₅S— |
| XV - 2 | H | —CO₂CH₃ | C₃H₇ | C₃H₇S— |
| XV - 3 | H | CN | C₄H₉ | C₄H₉S— |
| XV - 4 | CH₃ | —CO₂C₂H₅ | H | CH₃S— |
| XV - 5 | C₂H₅ | CN | H | C₂H₅S— |
| XV - 6 | C₃H₇ | —CO₂C₃H₇ | H | C₃H₇S— |
| XV - 7 | C₄H₉ | CN | H | CH₃S— |
| XV - 8 | CH₃ | —CO₂C₄H₉ | CH₃ | C₂H₅S— |
| XV - 9 | C₂H₅ | CN | C₂H₅ | CH₃S— |
| XV - 10 | C₃H₇ | —CO₂CH₃ | C₃H₇ | C₂H₅S— |
| XV - 11 | C₄H₉ | —CN | C₄H₉ | C₃H₇S— |
| XV - 12 | CH₃ | —CO₂C₂H₅ | C₂H₅ | CH₃S— |
| XV - 13 | C₂H₅ | —CN | C₃H₅ | C₄H₉S— |
| XV - 14 | C₃H₇ | —CO₂C₃H₇ | C₂H₅ | CH₃S— |
| XV - 15 | C₄H₉ | —CN | C₂H₅ | C₂H₅S— |
| XV - 16 | C₂H₅ | —CO₂C₄H₉ | C₄H₉ | C₃H₇S— |
| XV - 17 | C₄H₉ | —CN | CH₃ | C₄H₉S— |
| XV - 18 | CH₃ | —CO₂CH₃ | CH₃ | CH₃S— |
| XV - 19 | H | —CN | H | CH₃S— |

EXAMPLE XVI

The following illustrates the preparation of 4,5-diamino-2-methylthio-7H-pyrrolo[2,3-d]pyrimidine-6-carboxamide which is a compound of structure XII.

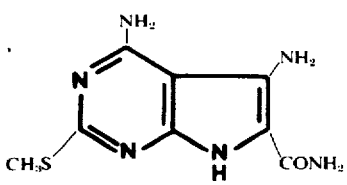

To a sodium ethoxide solution (0.9 g. sodium, 70 ml. ethanol) was added approximately 9.5 g of 2-[(6-amino-5-cyano-2-methylthio-4-pyrimidinyl)amino]acetamide, and the resulting mixture was refluxed for 1½ hr. After being chilled in ice, the reaction product was collected on a filter and washed with a small amount of ethanol and then with water. Recrystallization from dimethylformamide gave 1.4 g. of product having a melting point higher than 360°.

Anal. Calcd. for C₈H₁₀N₆OS: C, 40.33; H, 4.23; N, 35.28; S, 13.43. Found: C, 40.05; H, 4.16; N, 34.94; S, 13.57.

The product was evaluated in the foregoing pharmacological procedure and found to decrease motor activity and respiration at a dose of 127 MPK administered parenterally.

Following the procedure of Example XVI but substituting appropriate starting materials, compounds having the following substituents may be obtained:

| Example | R¹ | R² | R³ | R⁴ |
|---|---|---|---|---|
| XVI | H | CONH₂ | H | CH₃S— |
| XVI - 1 | H | —CO₂CH₃ | C₂H₅ | C₂H₅S— |
| XVI - 2 | H | CONH₂ | C₃H₇ | C₃H₇S— |
| XVI - 3 | H | —CO₂C₂H₅ | C₄H₉ | C₄H₉S— |
| XVI - 4 | CH₃ | CONH₂ | H | CH₃S— |
| XVI - 5 | C₂H₅ | —CO₂C₃H₇ | H | C₂H₅S— |
| XVI - 6 | C₃H₇ | CONH₂ | H | C₃H₇S— |
| XVI - 7 | C₄H₉ | —CO₂C₄H₉ | H | CH₃S— |
| XVI - 8 | CH₃ | CONH₂ | CH₃ | C₂H₅S— |
| XVI - 9 | C₂H₅ | —CO₂CH₃ | C₂H₅ | CH₃S— |
| XVI - 10 | C₃H₇ | CONH₂ | C₃H₇ | C₂H₅S— |
| XVI - 11 | C₄H₉ | —CO₂C₂H₅ | C₄H₉ | C₃H₇S— |
| XVI - 12 | CH₃ | CONH₂ | C₂H₅ | CH₃S— |
| XVI - 13 | C₂H₅ | —CO₂C₃H₇ | C₃H₇ | C₄H₉S— |
| XVI - 14 | C₃H₇ | CONH₂ | C₂H₅ | CH₃S— |
| XVI - 15 | C₄H₉ | —CO₂C₄H₉ | C₂H₅ | C₂H₅S— |
| XVI - 16 | C₂H₅ | CONH₂ | C₄H₉ | C₃H₇S— |
| XVI - 17 | C₄H₉ | —CO₂CH₃ | CH₃ | C₄H₉S— |
| XVI - 18 | CH₃ | CONH₂ | CH₃ | CH₃S— |
| XVI - 19 | H | —CONH₂ | H | CH₃S— |

What is claimed is:

1. A compound selected from those having the formula

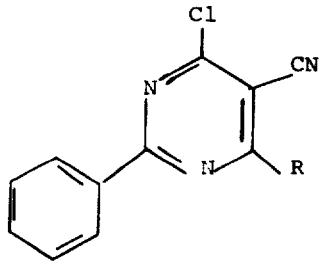

wherein R is amino, methylamino and ethylamino.

2. A compound as defined in claim 1 which is 4-amino-6-chloro-2-phenyl-5-pyrimidinecarbonitrile.

3. A compound as defined in claim 1 which is 6-chloro-4-methylamino-2-phenyl-5-pyrimidinecarbonitrile.

4. A compound as defined in claim 1 which is 4-chloro-6-ethylamino-2-phenyl-5-pyrimidinecarbonitrile.

* * * * *